United States Patent
Brunel et al.

(10) Patent No.: US 11,187,131 B2
(45) Date of Patent: Nov. 30, 2021

(54) DOUBLE CANNING EXHAUST GAS PURIFICATION DEVICE

(71) Applicant: FAURECIA SYSTEMES D'ECHAPPEMENT, Nanterre (FR)

(72) Inventors: Jean-Paul Brunel, Meslieres (FR); Bastien Decrouy, Melay (FR); Jean-François Perret, Chevremont (FR); Sébastien Hanauer, Le Haut Soultzbach (FR)

(73) Assignee: FAURECIA SYSTEMES D'ECHAPPEMENT

( * ) Notice: Subject to any disclaimer, the term of this patent is extended or adjusted under 35 U.S.C. 154(b) by 0 days.

(21) Appl. No.: 16/874,741

(22) Filed: May 15, 2020

(65) Prior Publication Data

US 2020/0362742 A1  Nov. 19, 2020

(30) Foreign Application Priority Data

May 17, 2019 (FR) ...................... 1905198

(51) Int. Cl.
*F01N 3/28* (2006.01)
*F01N 3/20* (2006.01)
*B01D 53/94* (2006.01)

(52) U.S. Cl.
CPC ......... *F01N 3/2864* (2013.01); *F01N 3/2013* (2013.01); *F01N 3/2839* (2013.01);
(Continued)

(58) Field of Classification Search
CPC ...... F01N 3/027; F01N 3/2013; F01N 3/2853; F01N 3/2864
See application file for complete search history.

(56) References Cited

U.S. PATENT DOCUMENTS 5,569,455 A 10/1996 Fukui et al.
2014/0212340 A1* 7/2014 Saiki ................ D06H 7/00
  422/179

(Continued)

FOREIGN PATENT DOCUMENTS

EP       3151633 A2    4/2017
WO   WO-2017198601 A1 * 11/2017 ........... F01N 3/2892

OTHER PUBLICATIONS

French Search Report dated Sep. 18, 2019.

*Primary Examiner* — Jonathan R Matthias
(74) *Attorney, Agent, or Firm* — Carlson, Gaskey & Olds, P.C.

(57) ABSTRACT

A purification device includes an outer housing canning, extending along a longitudinal axis, and in which exhaust gas is configured to circulate A purification unit is housed in the outer housing canning and incorporates at least one inductive element. An inner induction canning is housed in the outer housing canning and surrounds the purification unit, and comprises an induction device configured to induce an electric current in the at least one inductive element. A holding and insulation assembly is housed in the outer housing canning and surrounds the purification unit. The holding and insulation assembly includes at least one of: an inner holding web positioned radially between the inner induction canning and the purification unit, and/or end rings surrounding the purification unit and positioned on either side of the inner induction canning in a longitudinal direction parallel to the longitudinal axis.

19 Claims, 4 Drawing Sheets

(52) U.S. Cl.
CPC ............ *B01D 53/94* (2013.01); *F01N 3/2803* (2013.01); *F01N 2330/02* (2013.01); *F01N 2330/06* (2013.01); *F01N 2370/02* (2013.01); *F01N 2510/02* (2013.01); *F01N 2510/06* (2013.01)

(56) References Cited

U.S. PATENT DOCUMENTS

| | | | |
|---|---|---|---|
| 2017/0014765 A1 | 1/2017 | Crawford et al. | |
| 2019/0218949 A1* | 7/2019 | Crawford | H05B 6/365 |
| 2019/0323401 A1* | 10/2019 | Miyairi | H05B 6/108 |

* cited by examiner

DOUBLE CANNING EXHAUST GAS PURIFICATION DEVICE

CROSS REFERENCE TO RELATED APPLICATIONS

This application is a U.S. non-provisional application claiming the benefit of French Application No. 1905198, filed on May 17, 2019, which is incorporated herein by its entirety.

TECHNICAL FIELD

The present disclosure relates to an exhaust gas purification device, in particular for an internal combustion engine. Such an exhaust gas purification device is, for example, configured to equip a moving vehicle, such as a motor vehicle, a truck, a ship, etc., or to equip a stationary engine such as a generator set.

BACKGROUND

Already known in the state of the art is an exhaust gas purification device, including:
- an outer housing canning, extending in a longitudinal direction, and in which exhaust gas is intended to circulate,
- a purification unit, housed in the outer housing canning, incorporating at least one inductive element, and
- an induction device, housed in the outer canning and surrounding the purification unit, configured to induce an electric current in the at least one inductive element.

By passing an electric current in the induction device, the latter generates a magnetic field, in which the purification unit is located. An electric current is then induced in the inductive elements integrated into the purification unit, which results in heating this purification unit by joule effect.

The heating of the purification unit, and the exhaust gases passing through this purification unit, makes it possible to optimize the catalytic conversion of the polluting gases.

The present disclosure provides an improved purification device by respecting requirements for electrical insulation, magnetic confinement, holding in place of the purification unit, taking account of operation under high temperature conditions and high vibration conditions related to an exhaust system.

SUMMARY

An exhaust gas purification device, including:
- an outer housing canning, extending along a longitudinal axis, and in which exhaust gas is intended to circulate,
- a purification unit, housed in the outer housing canning, incorporating at least one inductive element,
- an inner induction canning, housed in the outer housing canning and surrounding the purification unit, and comprising an induction device, configured to induce an electric current in the at least one inductive element,
- a holding and insulation assembly, housed in the outer housing canning, and surrounding the purification unit, the holding and insulation assembly including at least one of the following elements:
  - an inner holding web, positioned radially between the inner induction canning and the purification unit, and/or
  - end rings, surrounding the purification unit, and positioned on either side of the inner induction canning in a longitudinal direction parallel to the longitudinal axis.

A purification device according to the disclosure may further include one or more of the following features, considered alone or according to any technically possible combinations:
  - The holding and insulation assembly includes an outer holding web, positioned radially between the inner induction canning and the outer housing canning.
  - The holding and insulation assembly includes the inner holding web and an outer holding web, the outer holding web being positioned radially between the inner induction canning and the outer housing canning, the inner and outer holding webs being coupled at their ends in the longitudinal direction.
  - The purification unit, the inner induction canning, the holding and insulation assembly, and the outer housing canning having general shapes of revolution around the same longitudinal axis.
  - The inner induction canning includes a magnetic flux concentrating shield surrounding the induction device.
  - The magnetic flux concentrating shield includes end rims extending in line with the induction device in the longitudinal direction.
  - The outer housing canning is made from a nonmagnetic metal, preferably a nonmagnetic steel, for example an austenitic stainless steel.
  - The inner holding web is made from two superimposed layers, each of these two superimposed layers having a general shape of revolution around the longitudinal axis while being wound on itself until its ends come together in a junction zone, the junction zones of the two superimposed layers being angularly offset relative to one another.

The disclosure also relates to an exhaust line of an internal combustion engine that includes a purification device as previously defined.

The disclosure lastly relates to a vehicle, in particular a motor vehicle, comprising an internal combustion engine, that includes an exhaust line as defined above.

BRIEF DESCRIPTION OF THE DRAWINGS

Various aspects and advantages of the disclosure will the highlighted in the following description, provided solely as a non-limiting example and done in reference to the appended figures, in which.

DETAILED DESCRIPTION

Figure 1:
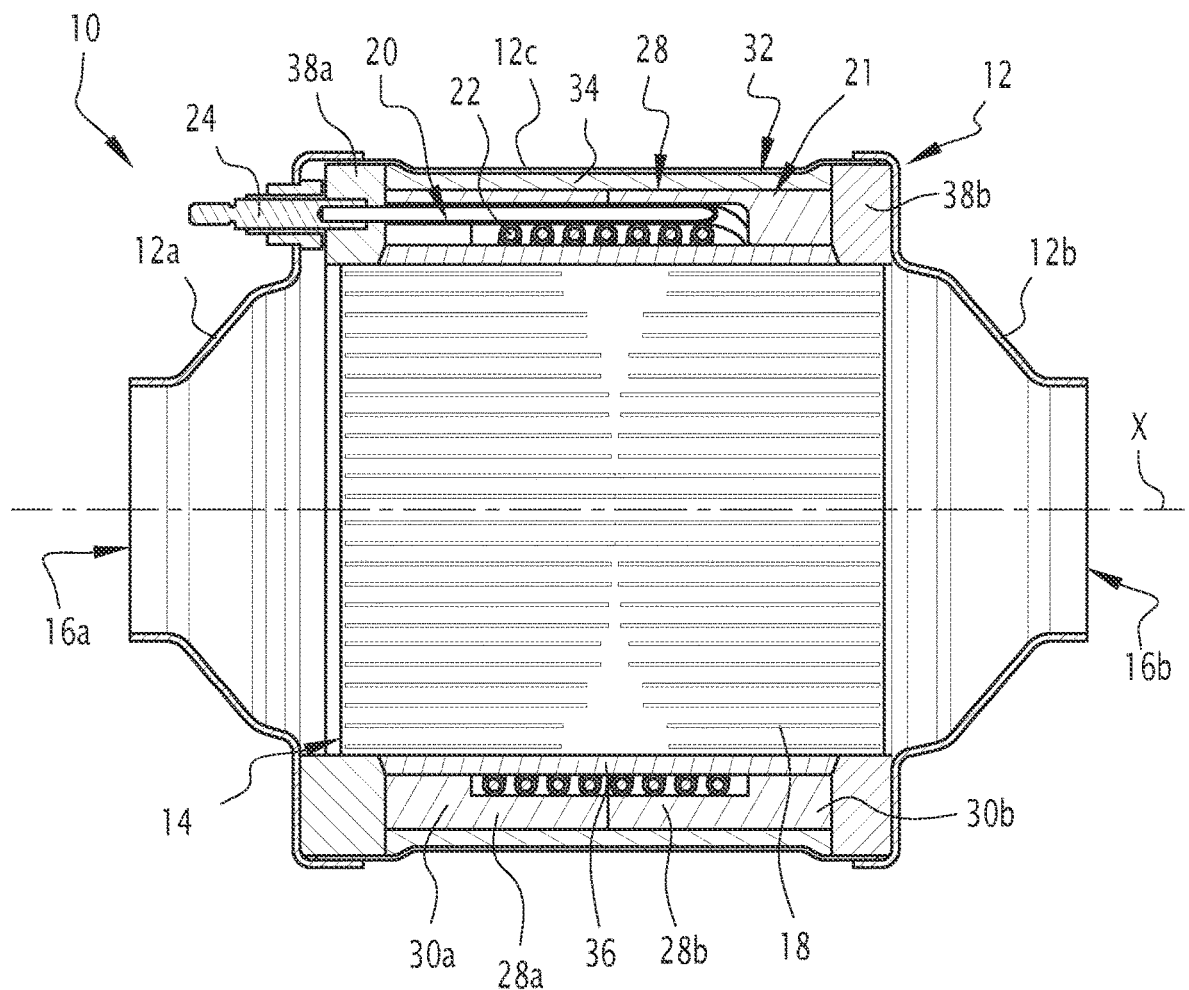
FIG. 1 is an axial sectional view of a purification device according to a first exemplary embodiment of the disclosure.

FIG. 1 shows an exhaust gas purification device 10. The purification device 10 is configured to be arranged in a combustion engine exhaust line, for example in a vehicle or in a stationary installation.

The purification device 10 includes an outer housing canning 12 of a conventional type, extending along the longitudinal axis X.

The purification device 10 further includes a purification unit 14, housed in the outer housing canning 12.

The outer housing canning 12 advantageously includes a flared inlet part 12a, for example frustoconical, widening from an inlet opening 16a toward the purification unit 14. This flared inlet part 12a is configured to be connected to an upstream pipe of the exhaust line.

In a variant, the diameter of the upstream pipe is substantially equal to that of the purification unit, in which case the outer housing canning 12 does not include a flared inlet part.

The outer housing canning 12 also advantageously includes a flared outlet part 12b, for example frustoconical, widening from an outlet opening 16b toward the purification unit 14. This flared outlet part 12b is configured to be connected to a downstream pipe of the exhaust line.

In a variant, the diameter of the downstream pipe is substantially equal to that of the purification unit, in which case the outer housing canning 12 does not include a flared outlet part.

The outer housing canning 12 lastly includes an intermediate part 12c extending, in a longitudinal direction parallel to the longitudinal axis X, between the inlet 12a and outlet 12b parts. The intermediate part 12c for example has a general shape of revolution around the longitudinal axis X. This intermediate part 12c surrounds the purification unit 14.

Thus, the exhaust gases are configured to circulate in the outer canning 12, from the inlet opening 16a to the outlet opening 16b, while passing through the purification unit 14.

The outer housing canning 12 is preferably made from a nonmagnetic metal, preferably a nonmagnetic steel, for example an austenitic stainless steel.

The purification unit 14 incorporates at least one inductive element 18, preferably a plurality of inductive elements 18. It will be recalled that an inductive element is an element in which an electric current is induced when it is subjected to a magnetic field.

The inductive elements 18 are for example metal rods, arranged parallel to one another, and parallel to the longitudinal axis X.

Figure 2:
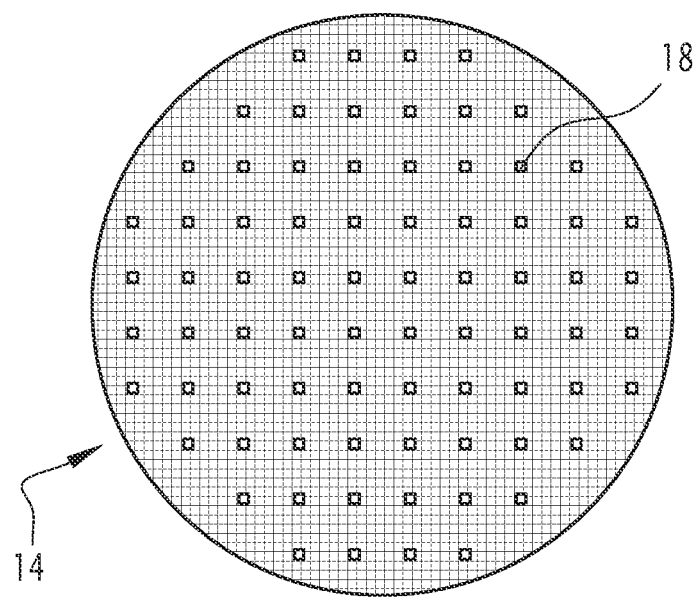
FIG. 2 is a cross-sectional view of a purification unit equipping the purification device of FIG. 1.

As shown in FIG. 2, the inductive elements 18 are aligned in rows and columns. Advantageously, the distance between two adjacent rows is identical for each pair of adjacent rows, and the distance between two adjacent columns is identical for each pair of adjacent columns. Preferably, the distance between two adjacent rows is equal to the distance between two adjacent columns.

It will be noted that FIG. 2 shows a purification unit 14 whereof the cross-section (that is to say, perpendicular to the longitudinal axis X) has a circular outer contour. In a variant, this outer contour could have any other conceivable shape, for example oval, oblong, or a polygonal shape, for example square or rectangular.

The purification unit is, for example, made from cordierite.

In order to subject the inductive elements 18 to a magnetic field, the purification device 10 includes an inner induction canning 21, comprising an induction device 20, housed in the outer canning 12 and surrounding the purification unit 14. In other words, the induction device 20 is positioned radially between the purification unit 14 and the intermediate part 12c of the outer canning 12.

It will be recalled that an induction device 20 is a device able to generate a magnetic field.

In the described example, the induction device 20 includes a coil 22, wound while surrounding the purification unit 14. The coil 22 extends between two terminals 24, one of which is shown in FIG. 1. Each terminal 24 passes through the outer canning 12, for example the inlet part 12a, so as to be accessible from outside the purification device 10, to be able to be coupled to an electrical power source.

Advantageously, the inner induction canning 21 further includes a magnetic flux concentrating shield 28, surrounding the induction device 20. The magnetic flux concentrating shield 28 therefore also surrounds the purification unit 14. The magnetic flux concentrating shield 28, for example, has a general shape of revolution around the longitudinal axis X.

The magnetic flux concentrating shield 28 is configured to prevent magnetic flux losses to the outside, by concentrating the magnetic fluxes toward the purification unit 14.

The magnetic flux concentrating shield 28 includes, at each of its ends in the longitudinal direction, a rim 30a, 30b. Each rim 30a, 30b extends across from the induction device 20 in the longitudinal direction. The magnetic flux concentrating shield 28 thus delimits a housing area for the induction device 20.

These rims 30a, 30b make it possible to optimize the guiding of the magnetic fluxes toward the purification unit 14, without dispersing toward the inlet 12a, outlet 12b parts and the intermediate part 12c of the outer canning 12. One thus avoids the heating of these inlet 12a and outlet 12b parts of the outer canning 12 by the magnetic fluxes.

The magnetic flux concentrating shield 28 is, for example, formed in two parts 28a, 28b, one of which 28a includes a passage allowing the access of the induction device 20 to the terminal 24. This form with two parts 28a, 28b makes it possible to facilitate the assembly, since it suffices to close the two parts 28a, 28b around the induction device 20 in order for this induction device 20 to be positioned between the rims 30a, 30b.

This two-part form 28a, 28b also makes it possible to ensure that they can withstand the pressure forces from the inner web, which ensures the holding of the purification unit 14 in the induction device 20.

The purification device 10 according to the disclosure includes a holding and insulation assembly 32.

The holding and insulation assembly 32 is housed in the outer canning 12, and forms an at least partial housing for the inner induction canning 21.

The holding and insulation assembly 32 surrounds the purification unit 14. The holding and insulation assembly 32, for example, has a general shape of revolution around the longitudinal axis X. In other words, the holding and insulation assembly 32 and the outer canning 12 have general shapes of revolution around a common longitudinal axis X.

Alternatively, the outer canning 12, the purification unit 14, the inner induction canning 21, and the holding and insulation assembly 32 can have any other appropriate shape, preferably defined around the common longitudinal axis X, for example an oval, oblong (or racetrack), elliptical, rectangular, TV screen, that is to say, substantially rectangular but with rounded corners), etc., shape.

According to the first embodiment shown in FIG. 1, the holding and insulating assembly 32 includes an outer holding web 34, an inner holding web 36, and end rings 38a, 38b.

It will be noted that other configurations can be considered in a variant. For example, the holding and insulating assembly 32 could not include end rings, but include the inner holding web 36 and the outer holding web 34, like in the second embodiment that will be described later.

According to another example, the holding and insulating assembly 32 could not include an inner holding web 36, but include the outer holding web 34 and the end rings 38a, 38b.

According to another example, the holding and insulating assembly 32 could not include an outer holding web 34, but include the inner holding web 36 and the end rings 38a, 38b.

Other combinations are conceivable, as long as the holding and insulating assembly 32 includes at least the inner holding web 36 and/or the end rings 38a, 38b.

The inner holding web 36 is located radially between the induction device 20 and the purifying unit 14, and also between the magnetic flux concentrating shield 28 and the purification unit 14. This inner holding web 36 is preferably in contact with the purification unit 14, such that it makes it possible to hold this purification unit 14. The inner holding web 36 also advantageously has a thermal insulating function of the induction device 20 and the magnetic flux concentrating shield 28, which typically only withstands a temperature below 500° C. The inner holding web 36 is therefore preferably made from a thermally insulating material, so as to protect the induction device 20 and the magnetic flux concentrating shield 28 from the heat emitted by the exhaust gases. Indeed, the temperature in the purification unit 14 can reach 950° C.

Preferably, the housing area for the induction device 20, delimited by the magnetic flux concentrating shield 28, is preferably filled with a filler paste, in which the induction device 20 is embedded. This filler paste then forms a flush surface, allowing a high insertion of the inner holding web 36.

Figure 4:
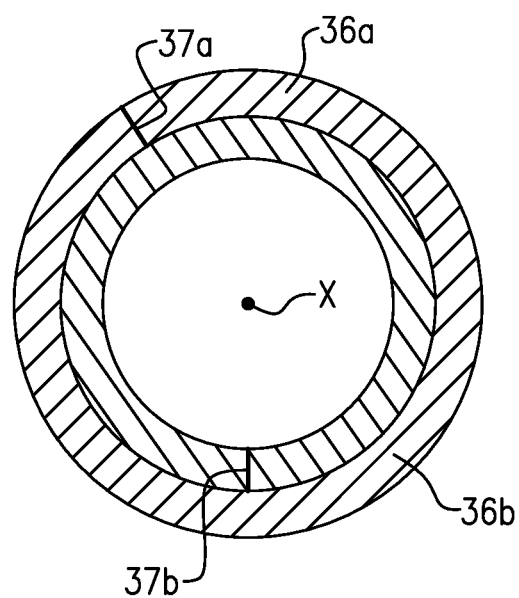
FIG. 4 is a schematic view showing an inner holding web that is made by two superimposed layers.

Preferably, the inner holding web 36 is made by two superimposed layers 36a, 36b, in order to increase the thermal protection of the inner induction canning 21. Each of these layers has a general shape of revolution around the axis X, while being wound around itself until its ends come together in a respective junction zone 37a, 37b. In order to ensure good thermal protection at all points of the inner surface of the inner induction canning 21, the junction zones 37a, 37b of the two layers are angularly offset relative to one another as shown in FIG. 4.

It should be noted that the outer holding web 34 can also be made in two superimposed layers, in the same way.

The outer holding web 34 is located radially between the magnetic flux concentrating shield 28 and the intermediate part 12c of the outer canning 12. This outer holding web 34 ensures the proper maintenance of the magnetic flux concentrating shield 28 in the outer canning 12. Preferably, the outer holding web 34 is made from a thermally insulating material, in order to thermally insulate the outer canning 12. This makes it possible to satisfy a common requirement of automotive builders, according to which the temperature of the outer canning 12 must not exceed 300 or 350° C.

The outer holding web 34 advantageously prevents direct contact between the magnetic flux concentrating shield 28 and the intermediate part 12c of the outer canning 12. Indeed, the thermal expansion coefficient of the magnetic flux concentrating shield 28 is different from that of the intermediate part 12c of the outer canning 12, which could cause, in the absence of the outer holding web 34, play between the magnetic flux concentrating shield 28 and the intermediate part 12c of the outer canning 12 in case of temperature variation. Such play would be detrimental to the holding of the magnetic flux concentrating shield 28. The outer holding web 34 makes it possible to prevent the appearance of such play.

Furthermore, the outer holding web 34 forms an electrical insulation making it possible to prevent any transmission of electrical current to the outer canning 12. Indeed, although the magnetic flux concentrating shield 28 is not very electrically conductive, it is not electrically insulating, such that the outer holding web 34 makes it possible to prevent electric current leaks toward the outer canning 12.

In the described example, the inner holding web 36 and/or the outer holding web 34 extends in the longitudinal direction X between the end rings 38a, 38b.

The end rings 38a, 38b are, for example, each formed by a mat of ceramic fibers, compressed such that the ceramic fibers are well maintained against one another, and such that the mat does not come apart under the effect of the gas flow pulsations. Such a compressed mat of ceramic fibers is practically impermeable to the gas.

The end rings 38a, 38b provide thermal protection against the magnetic flux concentrating shield 28. Indeed, the magnetic flux concentrating shield 28 generally has a low resistance to the high temperatures of the exhaust gases and against oxidation, but it is not in contact with these exhaust gases owing to the end rings 38a, 38b that are impermeable to the gas The end rings 38a, 38b also provide thermal protection against the induction device 20. Indeed, the electrical insulation of the coil 22 is also done using a fiberglass sheath, which generally does not withstand the exhaust gases at a high temperature. Owing to the end rings 38a, 38b, the exhaust gases do not come into direct contact with the coil 22.

The end rings 38a, 38b also participate in holding the inner induction canning 21, and also holding the purification unit 14. To that end, the end rings 38a, 38b extend radially between the purification unit 14 and the intermediate part 12c of the outer canning 12.

It should be noted that one of the end rings 38 includes a passage for the connection of the induction device 20 to the terminal 24. This end ring 38a protects the terminal 24, which, owing to this end ring 38a, is not in contact with the exhaust gases. The end ring 38a also contributes to the electrical insulation between the two terminals 24 and between the terminals 24 and the outer housing canning 12, while providing the possibility of a short-circuit due to the condensation of steam in this zone on these various elements.

Figure 3:
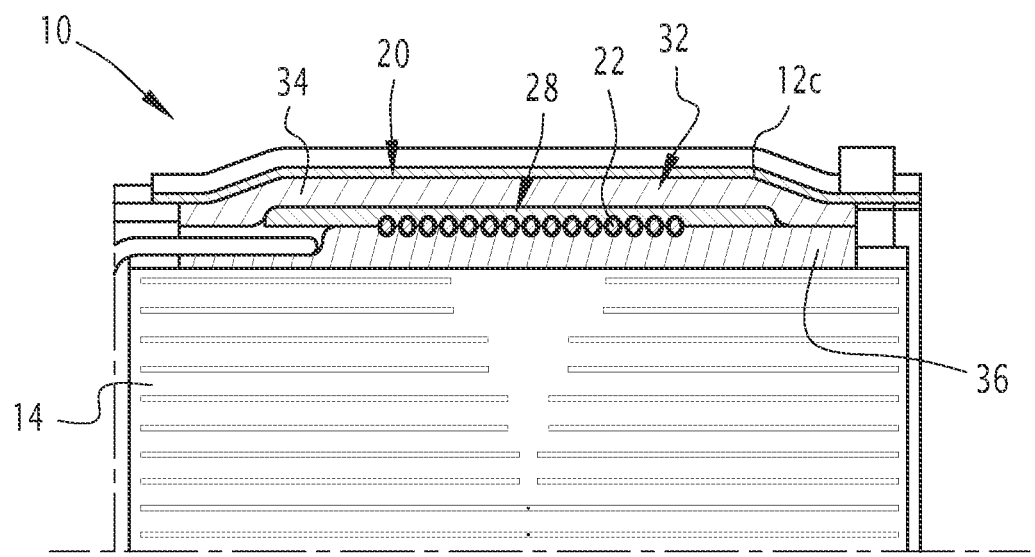
FIG. 3 is a partial axial sectional view of a purification device according to a second exemplary embodiment of the disclosure.

FIG. 3 shows a purification device 10 according to a second exemplary embodiment of the disclosure. In FIG. 3, the elements similar to those of the preceding embodiment are designated by identical references.

According to this second embodiment, the holding and insulating assembly 32 only includes the inner holding web 36 and the outer holding web 34, and does not include end rings.

In this case, the inner holding web 36 and the outer holding web 34 are directly coupled to one another at their ends in the longitudinal direction X. The holding of the inner induction canning 21 is then provided by the reduction in diameter of the outer holding web 34 and the intermediate part 12c of the outer canning 12.

It should be noted that, in this second embodiment, the magnetic flux concentrating shield 28 does not include rims framing the induction device 20. The induction device 20 is, however, partially embedded in the magnetic flux concentrating shield 28, which radially surrounds this induction device 20.

This second embodiment is suitable when weak heating of the purification unit 14 is necessary, in which case the electrical energy supplied to the induction device 20 is less significant. This low electrical energy involves a lesser need regarding the thickness of the magnetic flux concentrating shield 28, and as a result the lesser need of the rims of the magnetic flux concentrating shield 28.

It will be noted that the disclosure is not limited to the embodiments previously described, but could take the form of various additional variants without going beyond the scope of the claims.

Although various embodiments have been disclosed, a worker of ordinary skill in this art would recognize that certain modifications would come within the scope of this disclosure. For that reason, the following claims should be studied to determine the true scope and content of this disclosure.

The invention claimed is:

1. An exhaust gas purification device, including:
   an outer housing canning, extending along a longitudinal axis, and in which exhaust gas is intended to circulate,
   a purification unit housed in the outer housing canning and incorporating at least one inductive element,
   an inner induction canning, housed in the outer housing canning and surrounding the purification unit, and comprising an induction device, configured to induce an electric current in the at least one inductive element,
   a holding and insulation assembly, housed in the outer housing canning, and surrounding the purification unit, the holding and insulation assembly including an inner holding web, positioned radially between the inner induction canning and the purification unit, and
   and wherein:
   the inner induction canning includes a magnetic flux concentrating shield, surrounding the induction device, and
   the induction device is partially embedded in the magnetic flux concentrating shield.

2. The exhaust gas purification device according to claim 1, wherein the holding and insulation assembly includes an outer holding web, positioned radially between the inner induction canning and the outer housing canning.

3. The exhaust gas purification device according to claim 1, wherein the holding and insulation assembly includes the inner holding web and an outer holding web, the outer holding web being positioned radially between the inner induction canning and the outer housing canning, the inner and outer holding webs being coupled at ends of the inner and outer holding webs in the longitudinal direction.

4. The exhaust gas purification device according to claim 1, wherein the purification unit, the inner induction canning, the holding and insulation assembly, and the outer housing canning having general shapes of revolution around the same longitudinal axis.

5. The exhaust gas purification device according to claim 1, wherein the magnetic flux concentrating shield includes end rims extending in line with the induction device in the longitudinal direction.

6. The exhaust gas purification device according to claim 1, wherein the outer housing canning is made from a nonmagnetic metal.

7. The exhaust gas purification device according to claim 1, wherein the outer housing canning is made from a nonmagnetic steel.

8. The exhaust gas purification device according to claim 1, wherein the outer housing canning is made from an austenitic stainless steel.

9. The exhaust gas purification device according to claim 1, wherein the inner holding web is made from two superimposed layers, each of the two superimposed layers having a general shape of revolution around the longitudinal axis while being wound on itself until its ends come together in a junction zone, the junction zones of the two superimposed layers being angularly offset relative to one another.

10. The exhaust gas purification device of claim 1, wherein the inner holding web is in direct contact with the purification unit.

11. The exhaust gas purification device of claim 10, wherein the inner holding web is comprised of a thermally insulating material and is positioned directly between the inner induction canning and the purification unit.

12. The exhaust gas purification device according to claim 1, wherein the holding and insulation assembly includes an outer holding web, and wherein the inner and outer holding webs are directly coupled to one another at respective ends in a longitudinal direction parallel to the longitudinal axis.

13. The exhaust gas purification device according to claim 1, wherein the induction device includes a coil that is at least partially embedded in the magnetic flux concentrating shield.

14. The exhaust gas purification device of claim 13, wherein the outer housing canning includes an intermediate part extending, in the longitudinal direction, between a flared inlet part and a flared outlet part, and including a terminal associated with the coil, wherein the terminal passes through the flared inlet part of the outer housing canning.

15. An internal combustion engine exhaust line comprising:
   an exhaust gas purification device including:
   an outer housing canning, extending along a longitudinal axis, and in which exhaust gas is intended to circulate,
   a purification unit housed in the outer housing canning and incorporating at least one inductive element,
   an inner induction canning, housed in the outer housing canning and surrounding the purification unit, and comprising an induction device, configured to induce an electric current in the at least one inductive element,
   a holding and insulation assembly, housed in the outer housing canning, and surrounding the purification unit, the holding and insulation assembly including:
   an inner holding web in direct contact with the purification unit and positioned radially between the inner induction canning and the purification unit, and
   wherein the inner induction canning includes a magnetic flux concentrating shield, surrounding the induction device, and the induction device is partially embedded in the magnetic flux concentrating shield.

16. A vehicle comprising the internal combustion engine according to claim 15.

17. An exhaust gas purification device, including:
   an outer housing canning, extending along a longitudinal axis, and in which exhaust gas is intended to circulate,
   a purification unit housed in the outer housing canning and incorporating at least one inductive element,
   an inner induction canning, housed in the outer housing canning and surrounding the purification unit, and comprising an induction device, configured to induce an electric current in the at least one inductive element, and wherein the inner induction canning includes a magnetic flux concentrating shield, surrounding the induction device, and the induction device is partially embedded in the magnetic flux concentrating shield,
   a holding and insulation assembly, housed in the outer housing canning, and surrounding the purification unit, the holding and insulation assembly including an inner holding web and an outer holding web surrounding the purification unit, wherein the inner and outer holding webs are directly coupled to one another at respective ends in a longitudinal direction parallel to the longitudinal axis.

18. The exhaust gas purification device of claim 17, wherein the induction device includes a coil that is at least partially embedded in the magnetic flux concentrating shield.

19. The exhaust gas purification device of claim 18, wherein the outer housing canning includes an intermediate part extending, in the longitudinal direction, between a flared inlet part and a flared outlet part, and including a terminal associated with the coil, wherein the terminal passes through the flared inlet part of the outer housing canning.

\* \* \* \* \*